(12) United States Patent
Grantham et al.

(10) Patent No.: US 7,460,126 B2
(45) Date of Patent: Dec. 2, 2008

(54) SCALABLE METHOD AND SYSTEM FOR STREAMING HIGH-RESOLUTION MEDIA

(75) Inventors: Brad Grantham, San Jose, CA (US); David Shreiner, Mountain View, CA (US); Alan Commike, San Jose, CA (US)

(73) Assignee: Silicon Graphics, Inc., Sunnyvale, CA (US)

( * ) Notice: Subject to any disclaimer, the term of this patent is extended or adjusted under 35 U.S.C. 154(b) by 409 days.

(21) Appl. No.: 11/209,765

(22) Filed: Aug. 24, 2005

(65) Prior Publication Data
US 2006/0093044 A1  May 4, 2006

Related U.S. Application Data

(60) Provisional application No. 60/603,721, filed on Aug. 24, 2004.

(51) Int. Cl.
*G06F 15/80* (2006.01)
*G06F 15/16* (2006.01)
*G06F 15/167* (2006.01)
*G06T 1/20* (2006.01)

(52) U.S. Cl. ............... 345/505; 345/502; 345/506; 345/541

(58) Field of Classification Search .......... 345/502, 345/505, 506, 541
See application file for complete search history.

(56) References Cited

U.S. PATENT DOCUMENTS

| | | | | |
|---|---|---|---|---|
| 5,757,385 A | * | 5/1998 | Narayanaswami et al. | 345/505 |
| 6,088,044 A | * | 7/2000 | Kwok et al. | 345/505 |
| 6,105,053 A | * | 8/2000 | Kimmel et al. | 718/105 |
| 6,853,380 B2 | * | 2/2005 | Alcorn | 345/506 |
| 6,924,807 B2 | * | 8/2005 | Ebihara et al. | 345/503 |

* cited by examiner

*Primary Examiner*—Kee M. Tung
*Assistant Examiner*—Hau H Nguyen
(74) *Attorney, Agent, or Firm*—Sterne, Kessler, Goldstein & Fox P.L.L.C.

(57) ABSTRACT

A system and method for distributing data (e.g., imaging data such as pixels, or 3D graphics data such as points, lines, or polygons) from a single or a small number of data sources to a plurality of graphical processing units (graphics processors) for processing and display is presented. The system and method provide a pipelined and multithreaded approach that prioritizes movement of the data through a high-speed multiprocessor system (or a high-speed system of networked computers), according to the system topology. Multiple threads running on multiple processors in shared memory move the data from a storage device (e.g., a disk array), through the high-speed multiprocessor system, to graphics processor memory for display and optional processing through fragment programming. The data can also be moved in the reverse direction, back through the high-speed multiprocessor system, for storage on the disk array.

29 Claims, 9 Drawing Sheets

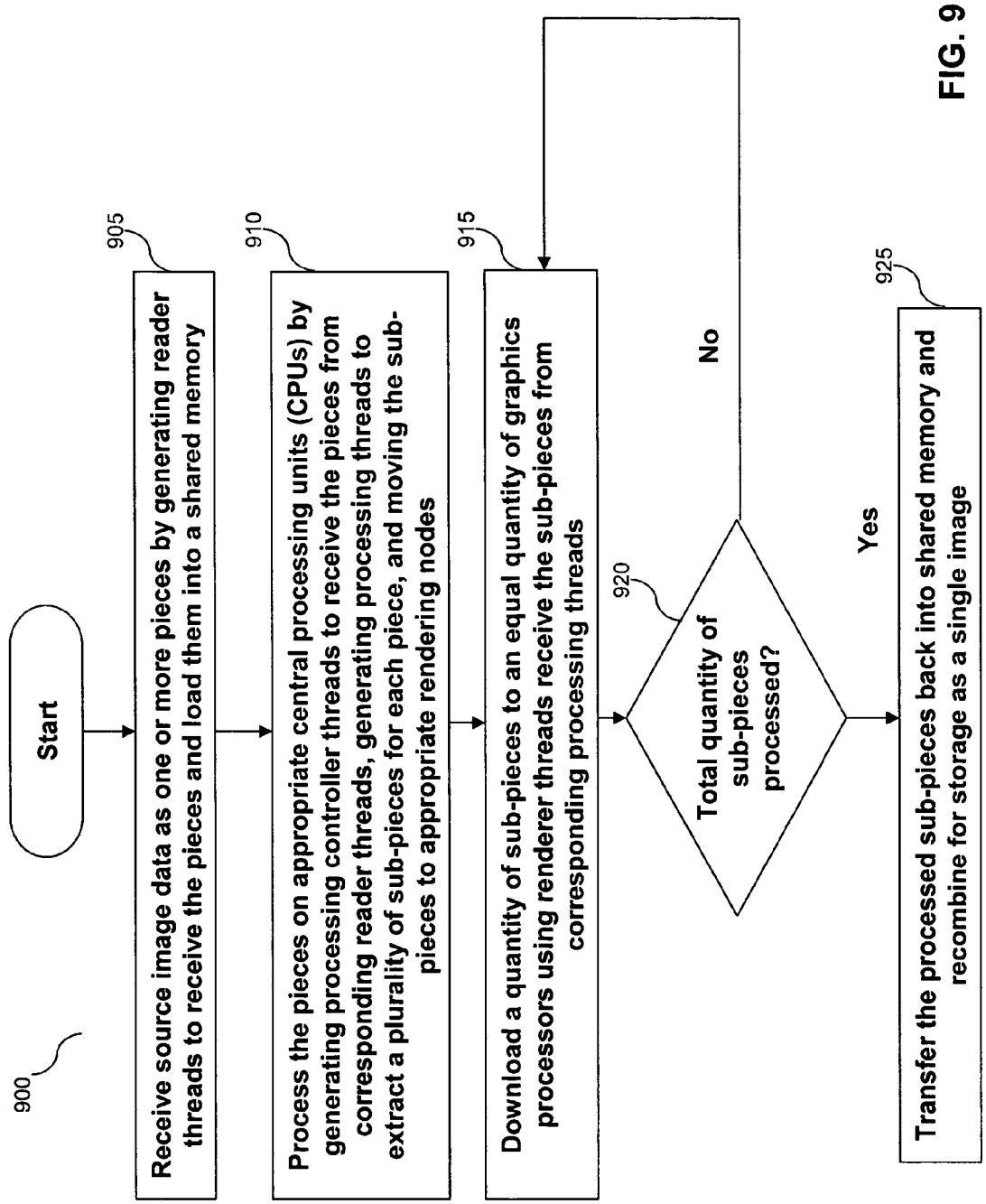

SCALABLE METHOD AND SYSTEM FOR STREAMING HIGH-RESOLUTION MEDIA

CROSS-REFERENCE TO RELATED APPLICATIONS

This application claims the benefit of U.S. Provisional Application No. 60/603,721, entitled "METHOD AND SYSTEM FOR USING SCALABLE GRAPHICS TO STREAM HIGH-RESOLUTION IMAGERY FOR DISPLAY OR PIXEL PROCESSING," filed Aug. 24, 2004, which is incorporated by reference herein in its entirety.

BACKGROUND OF THE INVENTION

Background Art

Conventional shared memory, multiprocessor systems can be too slow for processing and display of high-resolution and large-scale imagery or graphics, such as images captured by satellites, deep space telescopes, or on-board space vehicle cameras, as well as high-resolution movies. Thus, what is needed is a method and system for efficiently distributing high-resolution and large-scale image and graphics data with associated audio data through a shared memory, multiprocessor system for processing and/or display.

BRIEF DESCRIPTION OF THE DRAWINGS/FIGURES

FIGS. 7-9 show process flowcharts providing example steps for pipelined, multithreaded methods for prioritizing movement of high-resolution media through a shared memory, multiprocessor system, in accordance with one or more embodiments of the present invention.

DETAILED DESCRIPTION OF THE INVENTION

Overview

Figure 1:
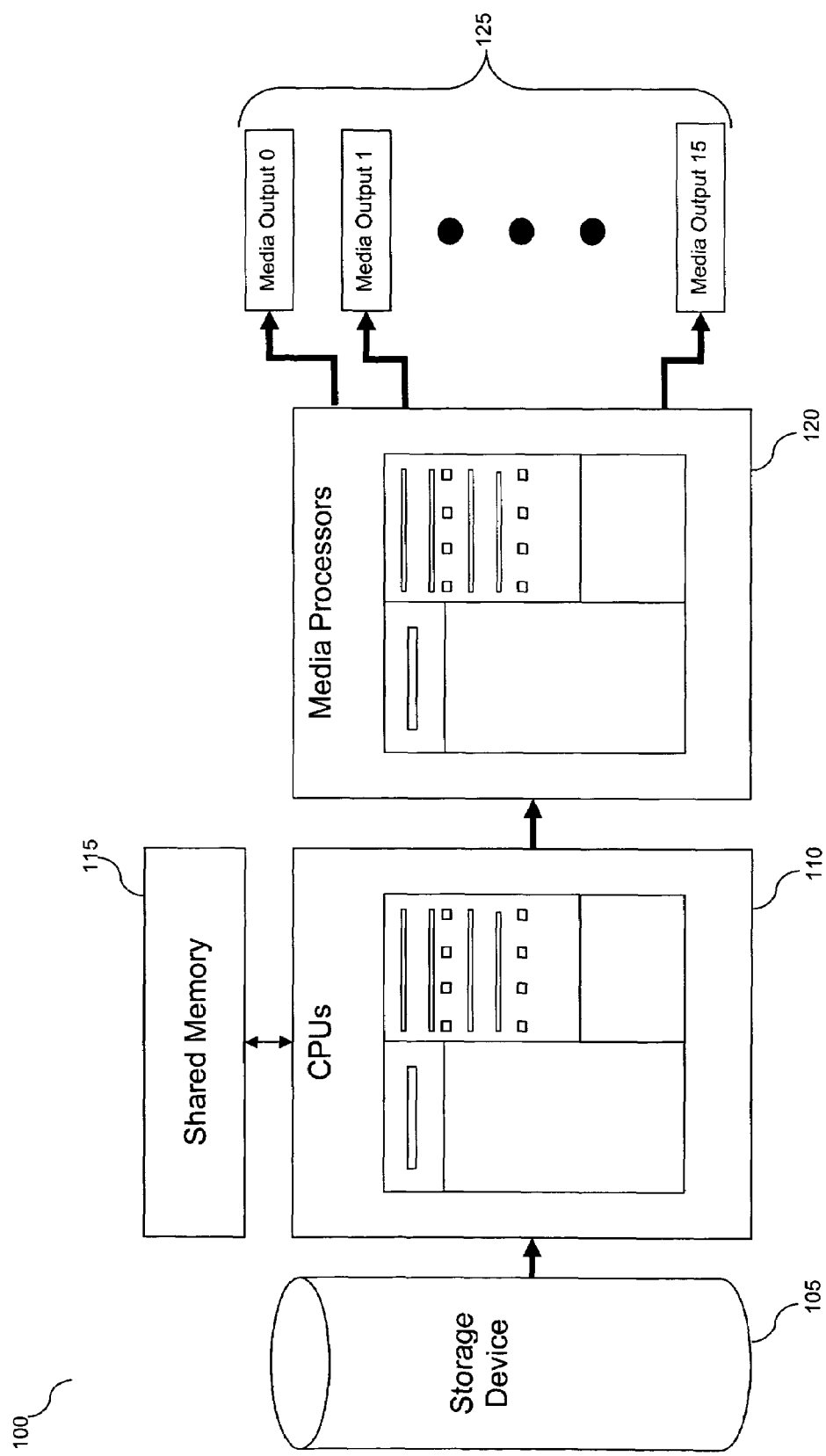
FIG. 1 is a high-level block diagram of a shared memory, multiprocessor system for streaming high-resolution media.

A system and method for distributing data (e.g., imaging data such as pixels, or 3D graphics data such as points, lines, or polygons) from a single or a small number of data sources to a plurality of graphical processing units (graphics processors) for processing and display is presented. The system and method provide a pipelined and multithreaded approach that prioritizes movement of the data through a high-speed multiprocessor system (or a system of high-speed networked computers), according to the system topology. Multiple threads running on multiple processors in shared memory move the data from a storage device (e.g., a disk array), through the high-speed multiprocessor system, to graphics processor memory for display and optional processing through fragment programming. The data can also be moved in the reverse direction, back through the high-speed multiprocessor system, for storage on the disk array.

In one embodiment, a pipelined, multithreaded system for prioritizing movement of data includes: one or more central processing units (CPUs), each CPU executing one or more threads, a plurality of media processors, and a shared memory. The threads include a read controller thread that controls one or more reader threads, a plurality of processing controller threads, each processing controller thread generating a plurality of processing threads, and a rendering controller thread that controls a plurality of renderer threads. Each reader thread receives a piece of source image data and loads the piece into the shared memory. Each processing controller thread receives a piece from a corresponding reader thread. Each processing thread extracts a plurality of sub-pieces from each piece and moves the sub-pieces through the system. Each renderer thread receives a sub-piece from a corresponding processing thread and downloads the sub-piece to an appropriate media processor for synchronized output of the sub-pieces.

In another embodiment, the threads include a read controller thread that controls a plurality of reader threads and a rendering controller thread that controls a plurality of renderer threads. Each reader thread receives a piece of source image data and loads the piece into the shared memory. Each renderer thread receives a piece from a corresponding reader thread and downloads the piece to an appropriate media processor for synchronized output of the pieces.

In yet another embodiment, a pipelined, multithreaded method for prioritizing movement of data includes: receiving source image data as one or more pieces, processing the pieces on appropriate CPUs, downloading the sub-pieces to corresponding media processors, and outputting synchronized sub-pieces. For each piece, a reader thread is generated that loads the piece into a shared memory. One or more processing controller threads receive the pieces from corresponding reader threads. Each processing controller thread generates a plurality of processing threads that extract sub-pieces for each piece. The processing threads move the sub-pieces to appropriate rendering nodes, and renderer threads executing on the CPUs receive the sub-pieces from corresponding processing threads.

In a further embodiment, a pipelined, multithreaded method for prioritizing movement of data includes: receiving source image data as a plurality of pieces, moving the pieces to appropriate rendering nodes, downloading the pieces to appropriate media processors, and outputting synchronized pieces. For each piece, a reader thread is generated that loads the piece into a shared memory, and a plurality of renderer threads that each receive the pieces from corresponding reader threads.

In a still further embodiment, a pipelined, multithreaded method for prioritizing movement of data includes: receiving source image data as one or more pieces, processing the pieces on appropriate CPUs, downloading a quantity of sub-pieces to an equal quantity of graphics processors, processing the sub-pieces on the graphics processors, and repeating the downloading and processing steps until a total quantity of sub-pieces is processed. For each piece, a reader thread is generated that loads the piece into a shared memory. One or more processing controller threads receive the pieces from corresponding reader threads. Each processing controller thread generates a plurality of processing threads that extract a plurality of sub-pieces for each piece. The processing threads move the sub-pieces to appropriate rendering nodes, and a plurality of renderer threads receive the sub-pieces from corresponding processing threads. In this embodiment, the total quantity of sub-pieces exceeds the quantity of graphics processors.

This specification discloses one or more embodiments that incorporate the features of this invention. The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Shared Memory, Multiprocessor System for Streaming High-Resolution Media

FIG. 1 illustrates a high-level block diagram of a shared memory, multiprocessor system 100 for streaming high-resolution media. System 100 includes a storage device 105, central processing units (CPUs) 110, a shared memory 115, media processors 120, and media outputs 125 associated with graphics processors 120. Each CPU 110 executes at least one thread of a pipelined, multithreaded program for prioritizing movement of data through system 100.

In one embodiment, system 100 includes a single system image computer (e.g., a computer workstation equipped for high-performance graphics) having a redundant array of inexpensive disks (RAID) storage subsystem for storage device 105, a non-uniform memory access system architecture (NUMA) memory for shared memory 115, graphics processors for media processors 120, and multiple digital video interactive (DVI) outputs for media outputs 125. A multi-threaded program allows system 100 to display a single image stream (e.g., a movie) to DVI outputs 125.

The multithreaded program reads a single image data file from storage device 105 by dividing the larger single image into smaller image pieces, and loads the pieces into shared memory 115. The multithreaded program processes the pieces on CPUs 110, optionally divides each of the image pieces into smaller sub-pieces, and moves the pieces or sub-pieces to graphics processors 120. Each graphics processor 120 processes a different piece or sub-piece. Processing by graphics processors 120 may include, for example, performing convolution, color correction, smoothing, edge detection, and orientation changes, among other processing techniques.

After graphics processors 120 process the pieces or sub-pieces, the image stream can be output to associated media outputs 125 in various ways. For example, a "power wall" of multiple displays, each displaying a different image piece or sub-piece, can be used to view a composite image stream, such as in a command and control military or rescue operations center. Also, a projector having multiple inputs can be used to combine the image pieces or sub-pieces and project the image stream as a single, larger image. After graphics processors 120 process the image pieces or sub-pieces, the processed pieces and sub-pieces can be optionally transferred back into shared memory 115, re-combined, and stored as a single, larger image on storage device 105.

By converting pixel data in multiple threads, the systems and methods described herein also optimize image download to OpenGL® or OpenML®. OpenGL® is an Application Programming Interface (API) developed by Silicon Graphics, Inc., Mountain View, Calif., for the development of 2D and 3D graphics applications. For more detailed information about OpenGL®, see "The OpenGL® Graphics System: A Specification," (Version 2.0—October 2004) by Mark Segal and Kurt Akeley, available from Silicon Graphics, Inc., and also available from http://www.opengl.org, which is incorporated herein by reference. OpenML® is an Application Programming Interface (API) also developed by Silicon Graphics®, for the development of video and audio applications. For more detailed information about OpenML®, see "OpenML® V1.0 Specification," Jul. 19, 2001, edited by Steve Howell, available from Khronos Group at http://www.khronos.org/, which is incorporated herein by reference.

Two example implementations of a shared memory, multiprocessor system for streaming high-resolution media are described below, followed by a discussion of example pipelined, multithreaded methods for prioritizing movement of high-resolution media through a shared memory, multiprocessor system.

First Example Implementation, Playback of a 4096 by 3112 Pixel "4K" Movie Using 16 Graphics Processors The system and method described above for prioritizing movement of data through a shared memory, multiprocessor system can be used for streaming image processing and, in particular, high-resolution movie playback in real time. An example implementation for playback of a 4096 by 3112 pixel movie is described below in conjunction with FIGS. 2-5. This implementation streams a series of 4096 by 3112 pixel images (i.e., frames) from a storage device through a scalable system to sixteen synchronized media outputs, which output video. The term "4K" is used for several different resolutions; in this example it denotes 4096 by 3112. Each pixel contains three 10-bit components packed into a 32-bit quantity, and thus a complete image requires a little more than 50 MB of storage. Thus, to display 24 frames per second, approximately 1.23 GB per second must be streamed from the disk to the output device.

Figure 2:
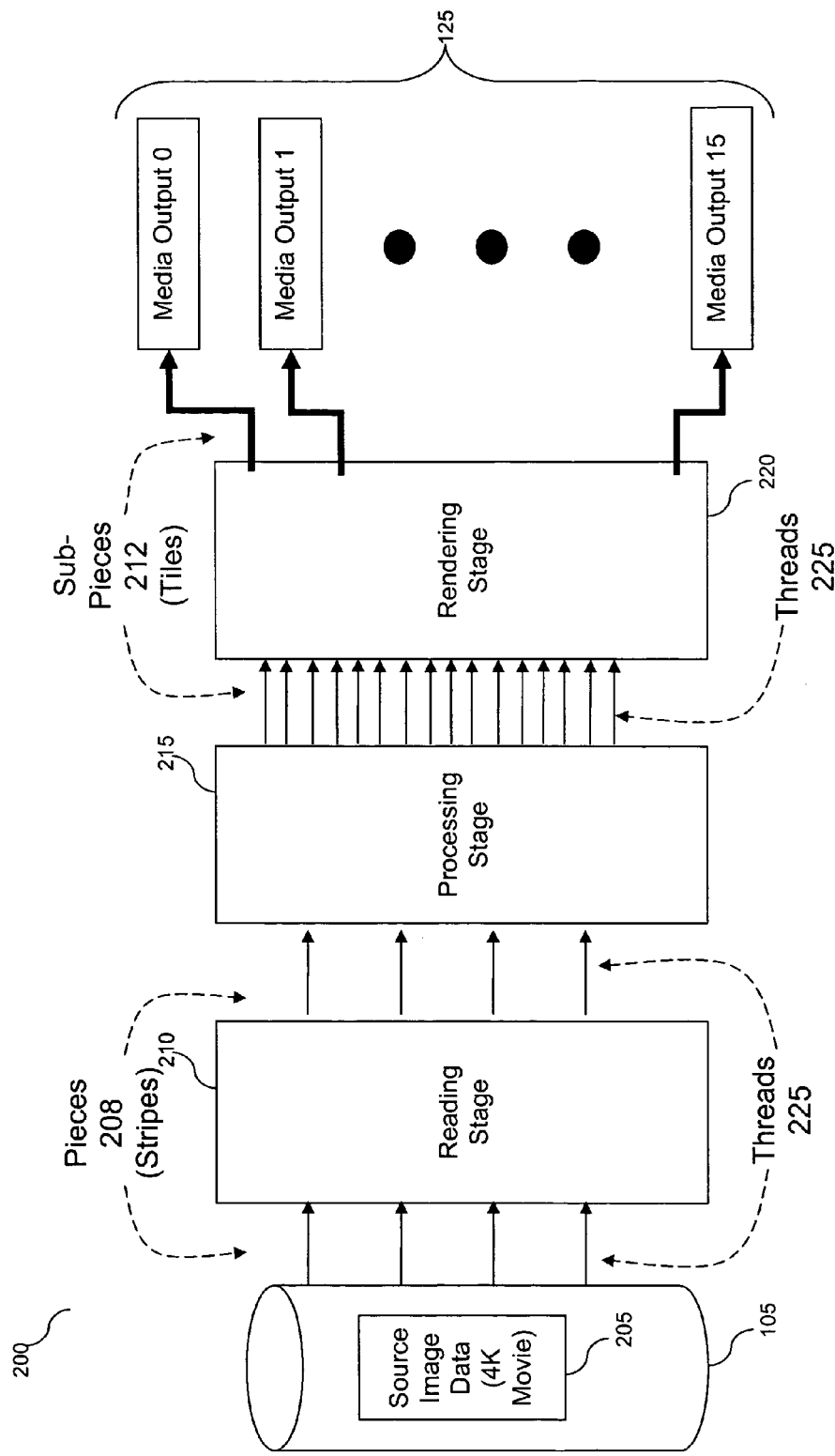
FIG. 2 is a block diagram of a shared memory, multiprocessor system for prioritizing movement of image data for display of a "4K" movie using a pipelined, multithreaded approach, in accordance with a first example implementation of the present invention.

A block diagram of a system 200 in accordance with the first example implementation is shown in FIG. 2. System 200 has a datacentric, pipelined, multithreaded design that prioritizes the movement of data through the system. System 200 includes storage device 105, which stores a source image (i.e., a 4K movie) 205, CPUs 110 (shown in FIG. 1), shared memory 115 (shown in FIG. 1), graphics processors 120 (shown in FIG. 1), and media outputs 125.

System 200 is implemented as a pipeline with three stages: a reading stage 210, a processing stage 215, and a rendering stage 220. Each stage in the pipeline consists of multiple threads 225, each thread performing that stage's operation on one piece (called a "stripe") 208 or sub-piece (called a "tile") 212 of source image 205. Each of the threads 225 in a stage is connected to an appropriate thread in the next stage with a thread-safe queue. Each of the threads 225 in a stage is also locked to a CPU 110 appropriate to that thread's data locality requirements, and memory used by that thread may be allocated on the node containing the CPU executing that thread or on the node containing the CPU executing the thread for the prior or subsequent pipeline stage.

Each image stripe 208 or tile 212 passing through the pipeline carries an image number, used for synchronization when necessary. In this example, the tile placement in a composite output image is implied by the ordering of the output device, which is a 4-input tiled video projector. In a more general implementation, tiles 212 could include a destination location and a size relative to the composite output image.

In this implementation, each stage operates on a "current target image number," defined by a global clock and a stage-specific time offset. This offset is defined in a text configuration file and can be configured to tune the buffering in the pipeline to reduce sensitivity to performance of the individual threads 225.

Each of the stages is described in detail below with respect to a system having sixteen graphics processors 120. The number of threads 225 and image regions in system 200, as well as CPUs 110 used to execute threads 225, are configured using a text file and can be retargeted for smaller or larger images in this implementation. A different implementation might use an automatic configuration based on discovery of the source image 205 and destination output characteristics.

Stage 1: Reading

Figure 3:
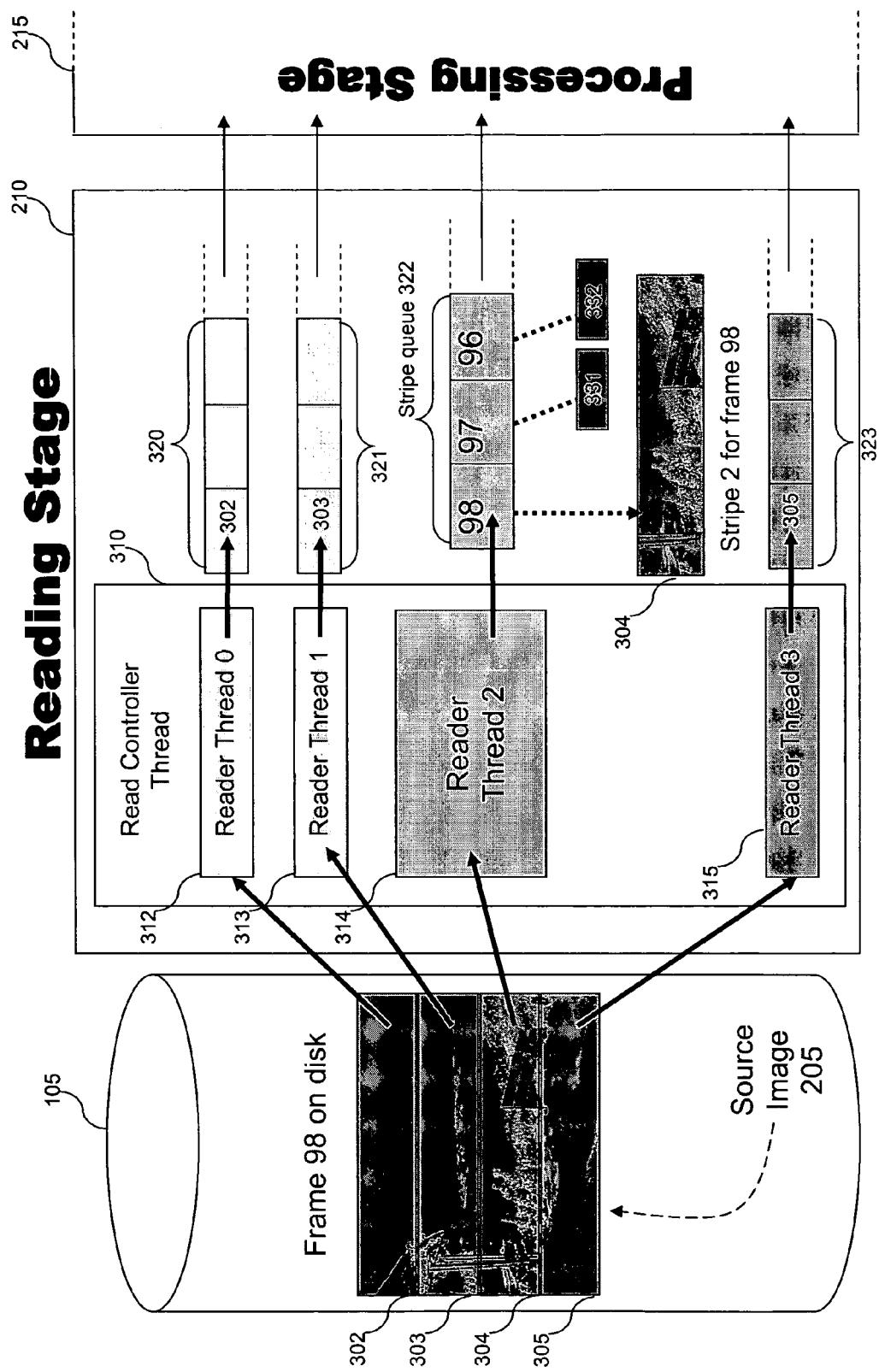
FIG. 3 illustrates a reading stage in accordance with the pipelined, multithreaded approach of FIG. 2.

The first stage in the pipeline is reading stage 210, shown in more detail in FIG. 3. As illustrated in the example of FIG. 3, reading stage 210 contains five threads 225: one read controller thread 310 and four reader threads 312, 313, 314, and 315. Read controller thread 310 controls reader threads 312-315. Read controller thread 310 identifies the most appropriate image to read for the current time and synchronizes reader threads 312-315 so that one thread does not get significantly out of step with the others.

Reader threads 312-315 read corresponding "stripes" 302, 303, 304, and 305 of 4096 by 3112 source image file 205 from disk 105, and load the stripes into memory 115 (shown in FIG. 1). In this example, stripes 302-305 have the same width as source image 205 and one quarter the height (i.e., 4096 by 778 pixels). Once stripes 302-305 are loaded into memory 115, a pointer to each stripe 302-305 is placed in a corresponding stripe queue 320, 321, 322, and 323 to the next stage (i.e., processing stage 215). For example, as shown in FIG. 3, stripe queue 322 has in its queue stripe 304 for frame 98 of source image 205, a stripe 331 for frame 97 of source image 205, and a stripe 332 for frame 96 of source image 205.

Reading stage 210 has high-bandwidth storage 105 capable of serving read requests for a part of source image file 205 to each reader thread 312-315. The read requests are a little more than 12.5 MB each and can be sequential. In this example, reading stage 210 is implemented with XFS® over fiber channel to one or more appropriately-sized RAIDs. XFS®, which is available from Silicon Graphics, Inc. (SGI), Mountain View, Calif., is the native file system for SGI computers and is fully supported by the open source community. In other implementations, reader threads 312-315 might receive source image data 205 from a network device, such as gigabit Ethernet or 10-gigabit Ethernet; or from other CPUs creating image data, such as a high-resolution ray-tracer; or from a video input device, such as a composite video input PCI card.

In this implementation, multiple threads are also slaved to each reader thread 312-315 using asynchronous I/O. Block data copies to the "buffer cache" are also avoided by using direct I/O.

Stage 2: Processing

Figure 4:
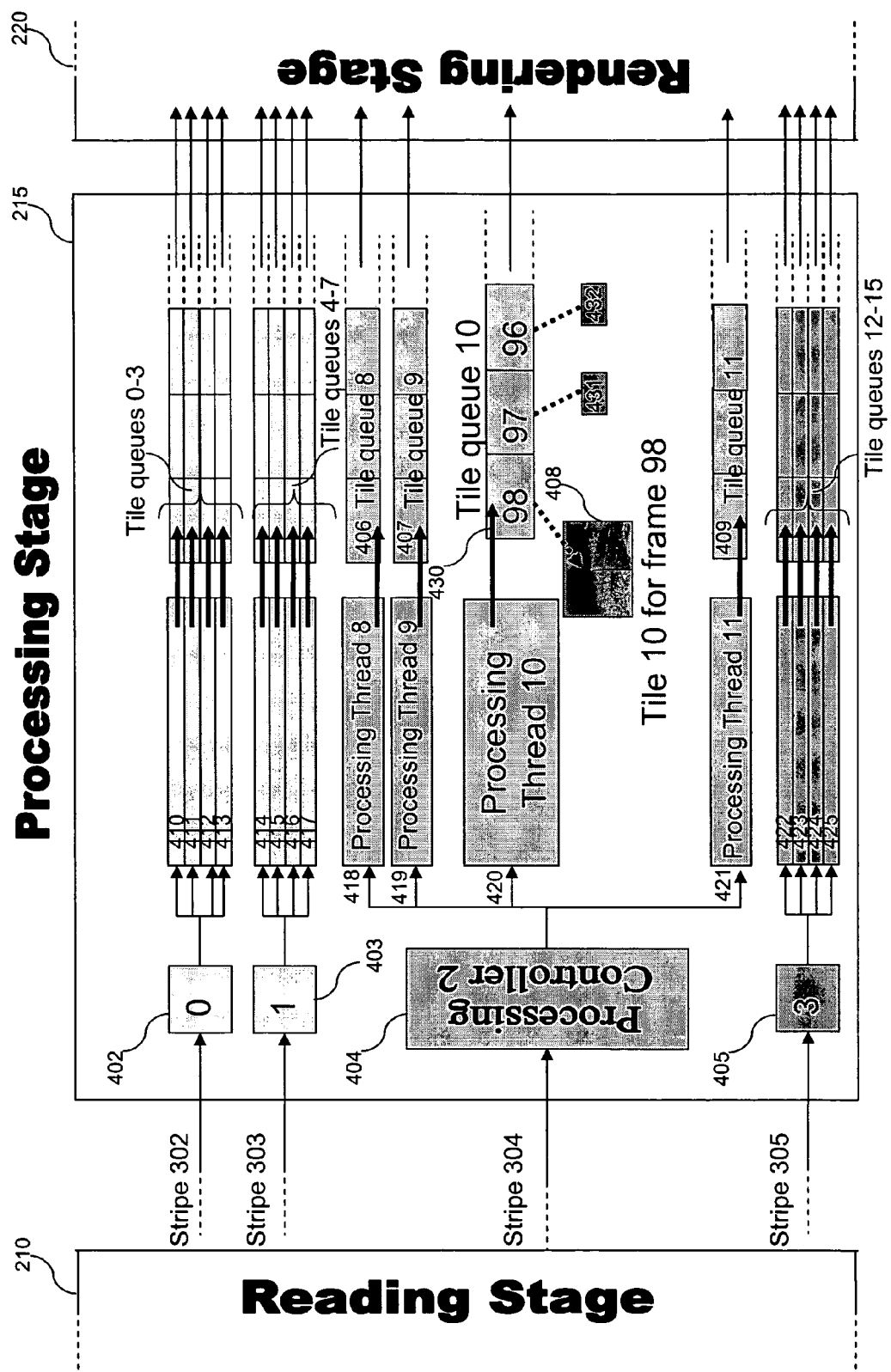
FIG. 4 illustrates a processing stage in accordance with the pipelined, multithreaded approach of FIG. 2.

The second stage in the pipeline is processing stage 215, shown in more detail in FIG. 4. Processing stage 215 includes four processing controller threads 402, 403, 404, and 405 and sixteen processing threads 410-425. Processing controller threads 402-405 each receive corresponding stripes 302-305 from reader threads 312-315. Then, each processing controller thread 402-405 generates four processing threads to extract "tiles" 212 from each stripe 302-305. For example, as shown in FIG. 4, processing controller thread 404 generates four processing threads 418, 419, 420, and 421 to extract four tiles 406, 407, 408, and 409 from stripe 304 of frame 98 of source image 205. In this example, a tile has the same height as a stripe and one quarter the width (i.e., 1024 by 778 pixels).

Each processing thread 410-425 copies a tile out of a source stripe, and queues the tile for the next stage (i.e., rendering stage 220) in a tile queue. For example, as shown in FIG. 4, processing thread 420 copies tile 408 out of stripe 304 and queues tile 408 in a tile queue 430. Tile queue 430 has in its queue the following tiles: tile 408 of stripe 304 for frame 98 of source image 205, a tile 431 of stripe 331 for frame 97 of source image 205, and a tile 432 of stripe 332 for frame 96 of source image 205.

Each processing thread 410-425 performs a memcpy operation for each tile row out of each stripe row. In another implementation, processing threads 410-425 could use NUMA operations to block-copy or Direct Memory Access (DMA) the row. In another implementation, processing threads 410-425 can also convert the pixels in a tile between pixel types and formats, or perform other operations such as filtering or decimation.

In this example, processing threads 410-425 are primarily responsible for moving data as fast as possible from the reader node to a renderer node. In this way, each processing thread 410-425 makes its tile local to the OpenGL context that is loading the tile pixels into a texture. Each processing thread 410-425 also makes the output image contiguous, so that the FGL_DYNAMIC_TEXIMAGE extension can be used to skip one copy of the image data internal to OpenGL and increase texture download speed.

Stage 3: Rendering

Figure 5:
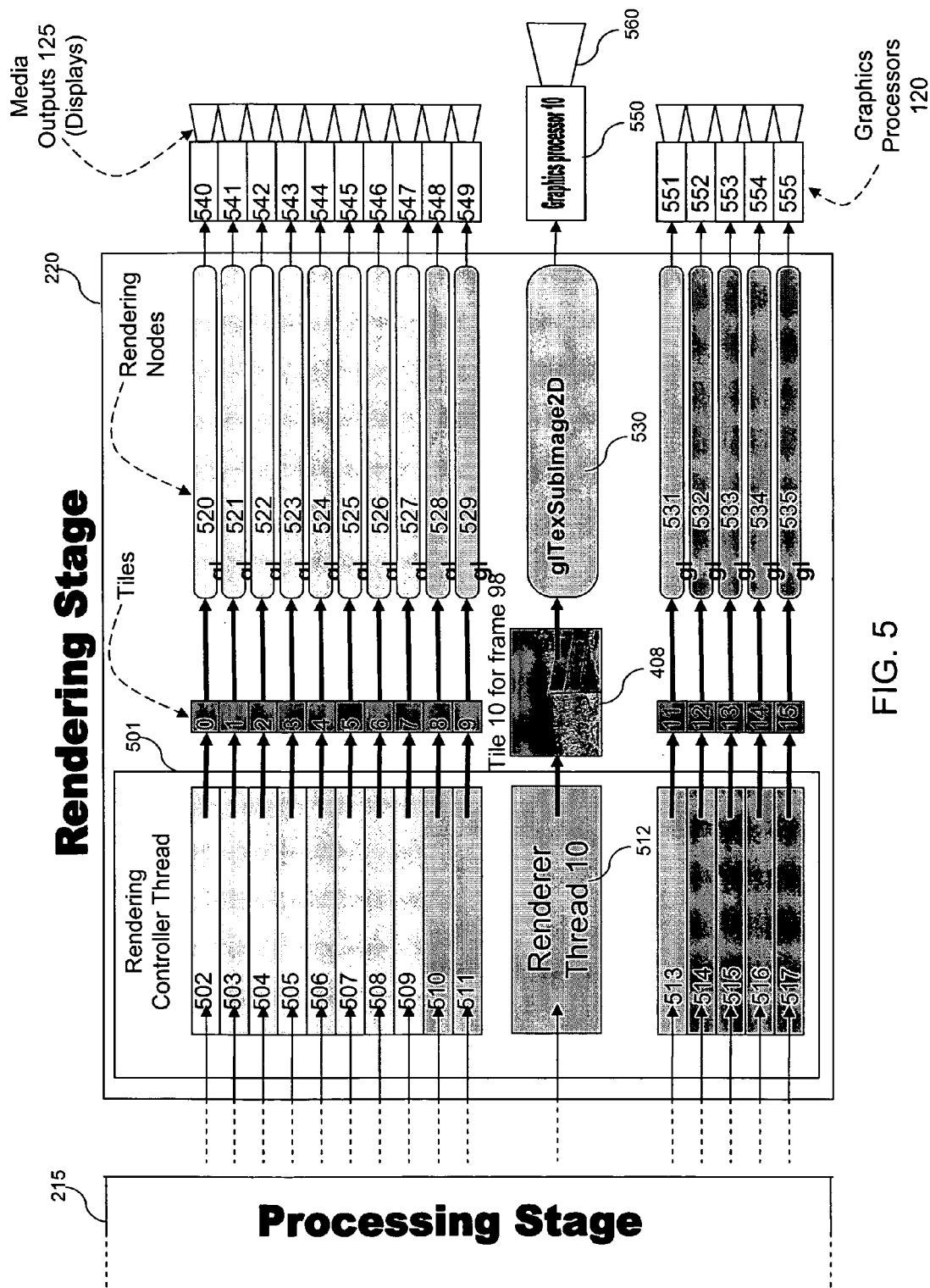
FIG. 5 illustrates a rendering stage in accordance with the pipelined, multithreaded approach of FIG. 2.

The third stage in the pipeline is rendering stage 220, shown in more detail in FIG. 5. Rendering stage 220 includes one rendering controller thread 501 and sixteen renderer threads 502-517. Renderer threads 502-517 receive tiles, synchronize among themselves so that the composite image formed from the tiles is consistent, choose the most "correct" tile for the current adjusted time, and download the tile data to texture (e.g., using glTexSubImage2D) and render a textured quad. For example, as shown in FIG. 5, renderer thread 512 receives tile 408 at rendering node 530, downloads tile 408 data to texture using glTexSubImage2D, and renders a textured quad.

The output portion of rendering stage 220 includes sixteen graphics processors ("display pipes") 540-555, each having an associated media output 125, which is a video display in this example. Each display 125 shows one tile from source image 205. For example, as shown in FIG. 5, graphics processor 550 processes tile 408 for output on display 560.

Display pipes 540-555 must show tiles from the same source image or visible tearing will occur at tile boundaries. Thus, logic in rendering controller thread 501 determines the most "correct" image number for the current time, queries reader threads 312-315 to determine which threads have been copied to rendering nodes 520-535, and chooses the most recent complete image to render that is not more recent than this "correct" image number. Each renderer thread 502-517 opens its own OpenGL context, so that OpenGL memory is local to that node.

Buffer swaps can be either locked to the video signal's vertical blanking interval (e.g., using _GL_SYNC_TO_V BLANK or xsetmon) or can be internally timed to float very close to 24 Hz. The video timing can be configured for 48 Hz, thus every other video frame would start at the correct time. Graphics pipes 540-555 can also be genlocked using an ImageSync™ card, available from Silicon Graphics®, for fully locked video and frame synchronization.

Buffering

Buffering is required because each stage of system 200 can run out of sync with the real 24 Hz frame clock, causing the playback to appear to stutter. The queue lengths and clock offsets can be configured during initialization, however, so the latencies can be set to buffer this stuttering.

As described above, the goal of this first example implementation is to run all pipeline stages at 24 frames per second all the time. For example, if reader threads 312-315 run too slowly, a frame will be skipped and eventually a newer frame will be read. When the newer frame appears at the rendering stage, the renderers will skip from the most recent complete frame to the newer frame. Likewise, if renderer threads 502-517 run too slowly, they will discard every frame in the pipeline except the newest. At worst, system 200 will at least keep up with the wall clock, even if it does not show every frame in the movie.

Each pipeline stage 210, 215, and 220 is connected to the next via a thread-safe queue (not shown) containing some number of slots (e.g., 32 slots) for image tiles. The buffering system is made thread-safe using UNIX semaphores and locking with "pthreads" mutex objects. A pipeline stage can enqueue tiles into its output queue until the queue is full. Thus, we say the pipeline stages are "buffered," so that a stall at one stage does not cause the previous stage to stall as well.

Configuration Files

In this example, the runtime configuration is driven from two text files. The first file describes the movie frames. The second file describes an object for each thread 225 in the running system 200, including the depth of queues, the frame time offsets, the CPU 110 assigned to execute the thread, and whether that CPU 110 is to be excluded from other threads that are not assigned to a particular CPU 110 (e.g., kernel, system threads, GUI, etc.). Each individual thread object can lock itself to a CPU 110 (e.g., using the pthread_setrunon_np call) and isolate the processor on which it runs (e.g., using sysmp). Thus, in this way system 200 performs a mapping of stages 210, 215, and 220 to CPUs 110 and emits the thread configuration file, which can then be customized by a user, depending on the topology of the installed system.

Test Results

A test implementation showed that a 32-processor, 16-pipe Onyx4™ system can reliably render a 4096 by 3112 pixel movie at 24 frames per second. The Onyx4™ UltimateVision™ system for advanced visual computing is available from Silicon Graphics®.

In the first example implementation described above, there are forty-three threads: one main thread (not shown in FIGS. 2-5), one read controller thread 310, four reader threads 312-315, four processing controller threads 402-405, sixteen processing threads 410-425, one rendering controller thread 501, and sixteen renderer threads 502-517. The main thread, controller threads 310, 402-405, and 501, and reader threads 312-315 do not utilize one hundred percent of a CPU 110 (i.e., they mostly calculate frame numbers, collate results, and wait on semaphores). Thus, in an example configuration, the main thread, controller threads 310, 402-405, and 501, and reader threads 312-315 are spread out and locked down on even-numbered CPUs 110, sharing time with processing threads 410-425, which are also locked down on even-numbered CPUs 110. Renderer threads 502-517 are locked on odd-numbered CPUs 110.

Another similar configuration showed that a 28-processor, 12-pipe Onyx4™ system can render a 4096 by 2180 pixel movie with even more CPU cycles free. Renderer threads 502-517 are sleeping much of the time, waiting on the completion of DMA from main memory to the graphics card. Thus, in one example configuration, processing threads 410-425 are on the same CPUs 110 as renderer threads 502-517, successfully using the CPU 110 to copy tile data while renderer threads 502-517 were waiting on DMA to complete.

While this test implementation was performed using an Onyx4™ system, the example streaming architecture for playback of a "4K" movie can also be implemented using other systems.

Second Example Implementation, Playback of a 3840 by 2160 Pixel "4K" Movie Using 4 Graphics Processors and 1 Audio Processor A second example implementation is described below in conjunction with FIG. 6. This implementation streams a series of 3840 by 2160 pixel images from a RAID storage device through a scalable system to five synchronized "OpenML" devices, four of which output video and one of which outputs audio. As described above, the term "4K" is used for several different resolutions; in this example it denotes 3840 by 2160. On disk, each pair of pixels is represented by four 10-bit components, and each component is packed into memory directly after the previous component, with no padding. Thus, in this example, a complete image requires a little more than 20 MB of storage. Thus, to display 24 frames per second, approximately 480 MB per second must be streamed from the disk to the output device.

Figure 6:
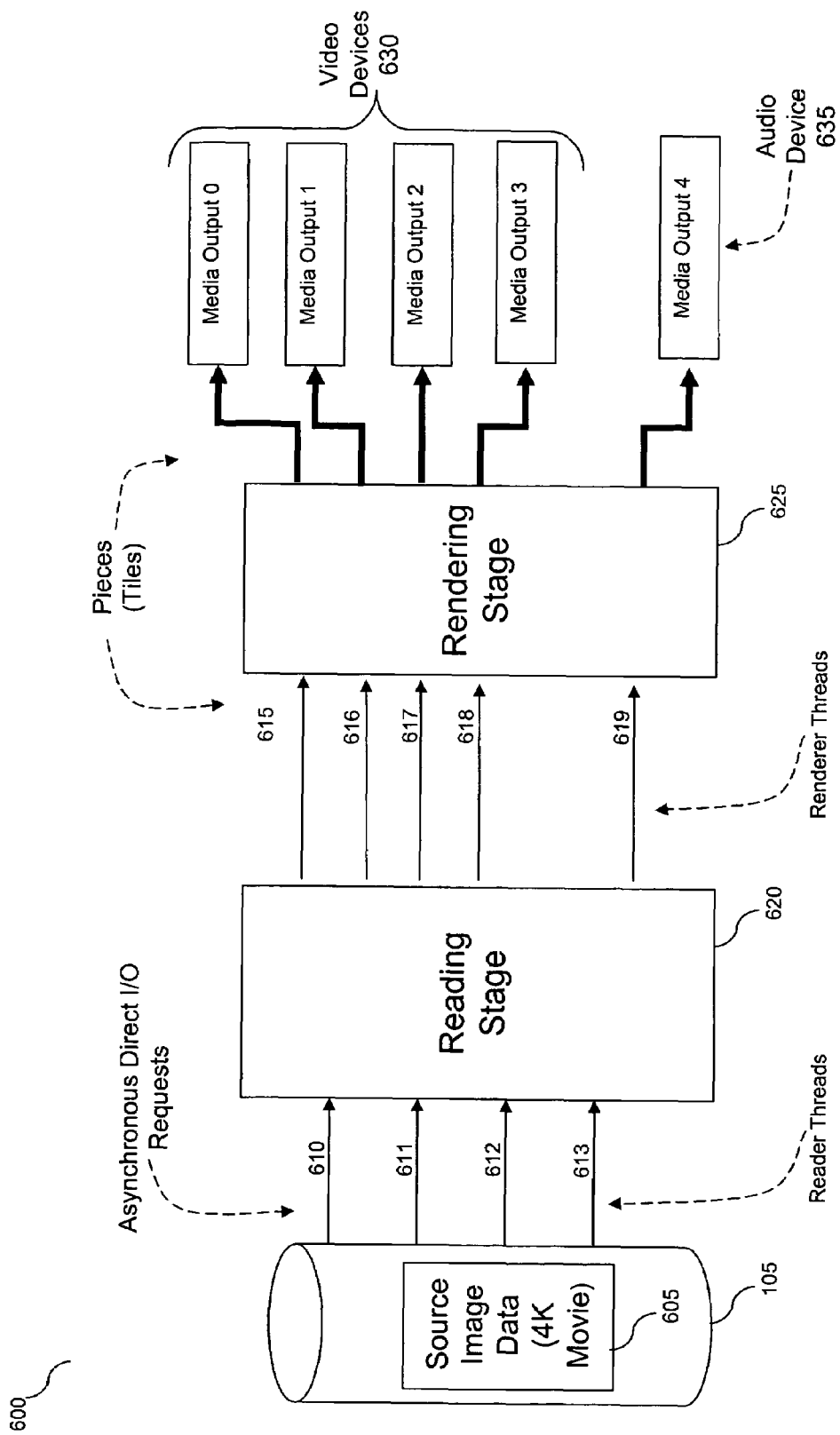
FIG. 6 is a block diagram of a shared memory, multiprocessor system for prioritizing movement of image data for display of a "4K" movie using a pipelined, multithreaded approach, in accordance with a second example implementation of the present invention.

FIG. 6 illustrates a block diagram of a system 600, in accordance with the second example implementation. As described above, system 600 includes a storage device 105, which stores a series of 3840 by 2160 pixel source images 605. Unlike system 200, system 600 contains only two pipeline stages: a reading stage 620 and a rendering stage 625. Reading stage 620 contains one read controller thread (not shown) and four reader threads 610, 611, 612, and 613, each reading a quarter of source image 605. Rendering stage 625 contains one rendering controller thread (not shown), four video renderer threads 615, 616, 617, and 618, and one audio renderer thread 619. Each video renderer thread 615-618 controls a corresponding OpenML video output device 630, and audio renderer thread 619 controls an OpenML audio output device 635.

Stage 1: Reading

As in the previous example, a read controller thread synchronizes and directs reader threads 610-613 to issue reads from source image 605. Each block read is executed in a separate subthread in order to perform asynchronous I/O.

Each subthread also uses direct I/O in order to avoid a redundant copy into the buffer cache (not shown).

Stage 2: Rendering

Each renderer thread (video renderer threads 615-618 and audio renderer thread 619) opens a corresponding OpenML device (video devices 630 and audio device 635), as specified in the text configuration file. Renderer threads 615-619 then synchronize with a sixth "media player management" thread (not shown). If the management thread calculates that the five rendering threads 615-619 did not start at the same time (as described below) then management thread instructs renderer threads 615-619 to close and reopen their corresponding OpenML devices until the devices are synchronized.

Buffering and Hardware Synchronization

Like the first example implementation described above, the second example implementation uses a buffering system between pipeline stages 620 and 625. However, this implementation does not attempt to keep up with any wall clock. Instead, in this implementation it is assumed that: reading stage 620 can deliver each frame more than fast enough on average; renderer threads 615-619 can download image data more than fast enough on average; and output devices 630 and 635 remain synchronized with each other and output one frame of data per time allocated to a single frame. At 24 frames per second, these assumptions imply that the reading and rendering operations must complete in 41 milliseconds or less.

Synchronization in the output devices is ensured by a master clock, which drives the internal clocks of audio device 635 and video devices 630. Thus, the scan-out of four video frames and the output of the beginning of a frame's worth of audio data start at the same time down to the resolution of the master clock. The five output devices are opened with blank data, and the time at which they output the first frame of blank data is recorded. If these times are not coincident with the same master clock pulse, then the devices are closed and opened again (based on the assumption that the devices will eventually be synchronized).

Reading stage 620 is configured with its per-stage time 48 frames in the future (e.g., 2 seconds at 24 frames per second), thus reader threads 610-613 can read and enqueue at least 48 frames before renderer threads 615-619 begin feeding those images to display devices 630. As mentioned above, reading stage 620 and rendering stage 625 have to complete their operation for a frame in less than approximately 41 milliseconds. As long as this rate is sustained, the queues become full and remain full.

Because the queue between reading stage 620 and rendering stage 625 contains 48 frames, when the queue is full, system 600 can recover from up to two seconds of delays in reading stage 620. In this implementation, when the buffer becomes empty, the program simply stops.

Further Applications

The examples of streaming architecture for playback of a "4K" movie described above can be adapted to the display of many individual image streams, arranged, for example, to cover the room of a planetarium. The input stream can also be from a series of individual frames (i.e., a movie), from a collection of several movies, or can be the collated output of a large number of CPUs creating 2D imagery. A further adaptation of the streaming architecture is to mix various movie streams (i.e., "image fusion," "data fusion," or simply "fusion"). While the example streaming architectures described above did not incorporate read back (e.g., glRead-Pixels), another adaptation can download data, perform pixel processing, read back the data, and store the results on the same or another disk array (or other storage device).

Methods for Prioritizing Movement of High-Resolution Media

Figure 7:
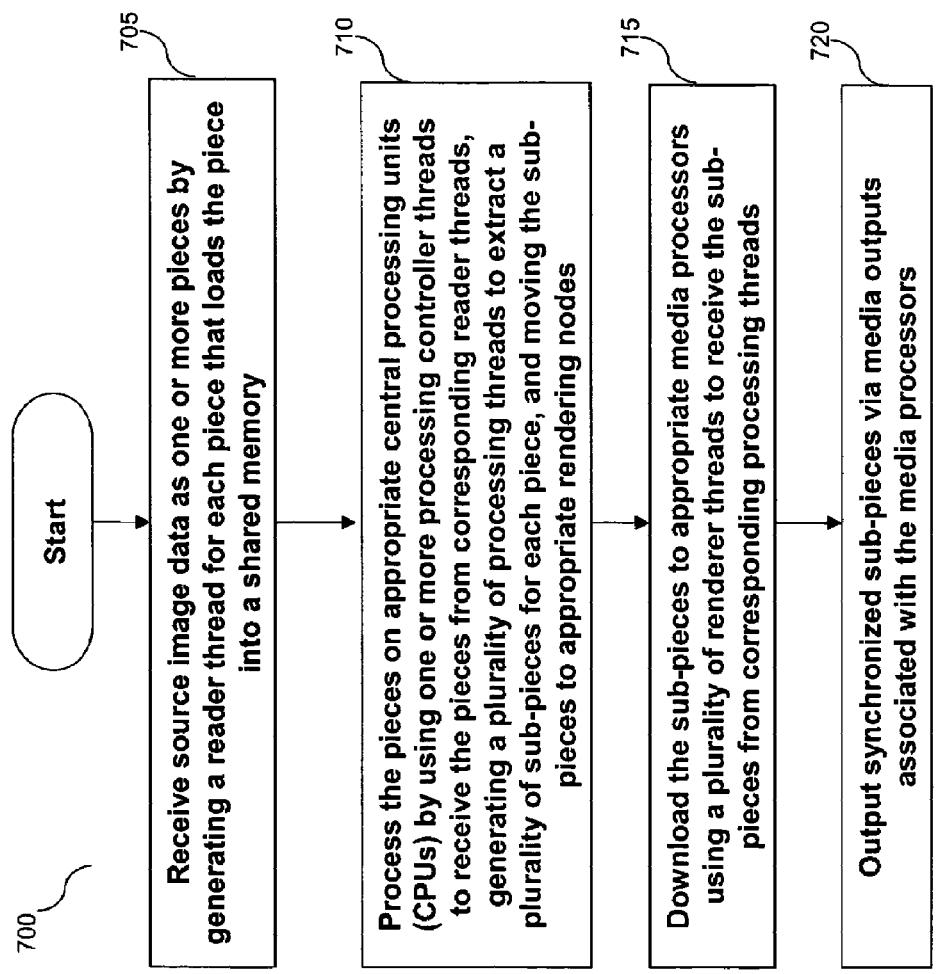
Figure 8:
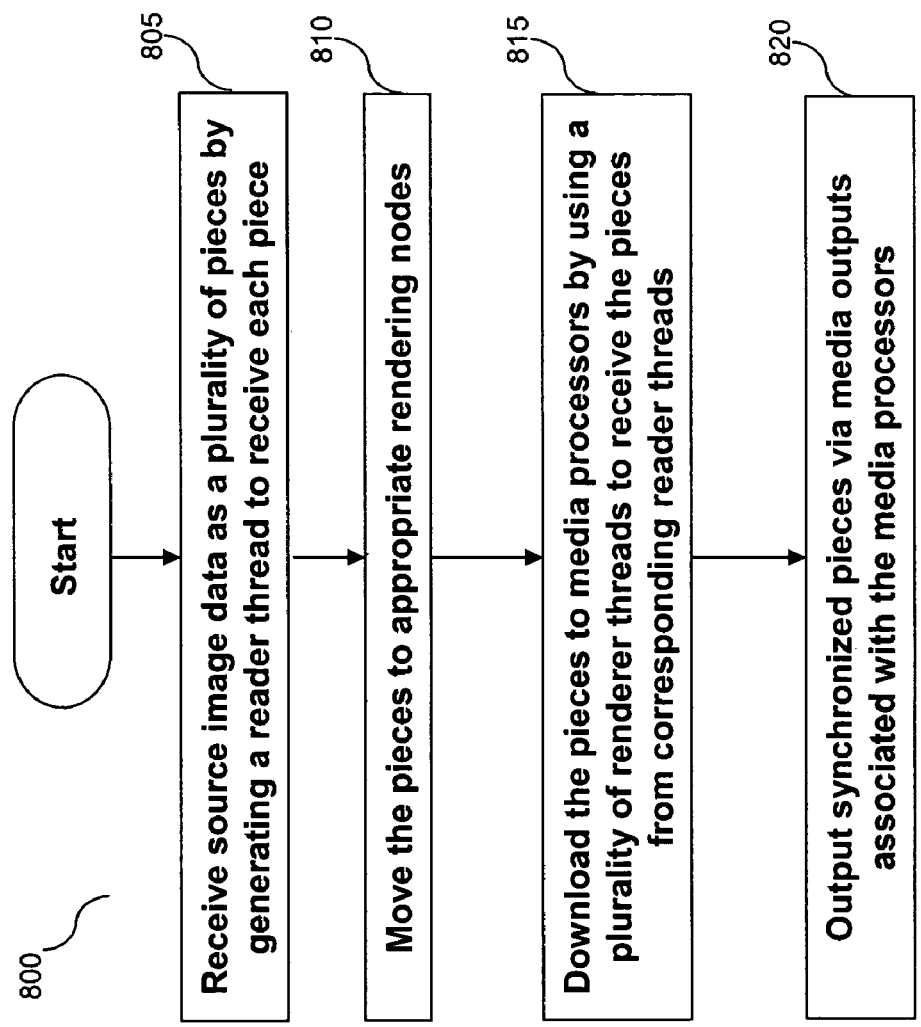

FIGS. 7-9 show process flowcharts providing example steps for prioritizing movement of high-resolution media through a shared memory, multiprocessor system, according to one or more embodiments of the present invention. The steps of FIGS. 7-9 do not necessarily have to occur in the order shown, as will be apparent to persons skilled in the relevant art(s) based on the teachings herein. Other operational and structural embodiments will be apparent to persons skilled in the relevant art(s) based on the following discussion. These steps are described in detail below.

FIG. 7 shows a process flowchart 700 providing example high-level steps for prioritizing movement of high-resolution media through a shared memory, multiprocessor system according to one embodiment.

In step 705, source image data is received as one or more pieces by generating a reader thread for each piece that loads the piece into a shared memory. For example, as shown in FIG. 3, four reader threads 312-315 receive pieces (i.e., stripes) 302-305 of source image 205, which is a frame of a "4K" movie file stored on storage device 105. Stripes 302-305 are loaded into shared memory 115 (shown in FIG. 1).

In step 710, the pieces are processed on appropriate CPUs by using one or more processing controller threads to receive the pieces from corresponding reader threads, generating a plurality of processing threads to extract a plurality of sub-pieces for each piece, and moving the sub-pieces to appropriate rendering nodes. For example, as shown in FIG. 4, processing controller threads 402-405 receive stripes 302-305 from reading stage 210. Each processing controller thread 402-405 generates four processing threads 410-425 to extract four tiles from each stripe and move the tiles to rendering stage 220.

In step 715, the sub-pieces are downloaded to appropriate media processors using a plurality of renderer threads to receive the sub-pieces from corresponding processing threads. For example, as shown in FIG. 5, renderer threads 502-517 receive tiles from processing stage 215 and download the tiles to graphics processors 540-555.

In step 720, synchronized sub-pieces are output via media outputs associated with the media processors. For example, as shown in FIG. 5, each graphics processor 540-555 has an associated video display 125. Each video display 125 displays a tile, forming a composite output image stream.

FIG. 8 shows a process flowchart 800 providing example high-level steps for prioritizing movement of high-resolution media through a shared memory, multiprocessor system according to another embodiment.

In step 805, source image data is received as a plurality of pieces by generating a reader thread to receive each piece. For example, as shown in FIG. 6, four reader threads 610-613 receive pieces of source image 605.

In step 810, the pieces are moved to appropriate rendering nodes. For example, as shown in FIG. 6, reading stage 620 moves the pieces to rendering stage 625.

In step 815, the pieces are downloaded to media processors by using a plurality of renderer threads to receive pieces from a corresponding reader threads. For example, as shown in FIG. 6, renderer threads 615-618 receive the pieces from corresponding reader threads 610-613 and download the pieces to media processors having associated media outputs 630 and 635. In the example of FIG. 6, renderer threads 615-618 are video renderer threads that download the source image pieces to graphics processors. An additional renderer thread 619 is an audio renderer thread that receives audio data associated with source image data 605 and downloads the audio data to an audio processor.

In step 820, synchronized pieces are output via media outputs associated with the media processors. For example, as shown in FIG. 6, each video output 630 displays a piece of the source image data 605, forming a composite output image stream. In the example of FIG. 6, the display of the source image pieces via video outputs 630 is synchronized with playback of the audio data via an audio output 635.

FIG. 9 shows a process flowchart 900 providing example high-level steps for prioritizing movement of high-resolution media through a shared memory, multiprocessor system according to a further embodiment.

In step 905, one or more pieces of a source image are received by generating reader threads to receive the pieces and load the pieces into a shared memory. For example, in FIG. 3, reader threads 312-315 receive stripes 302-305 of source image 205 and load the stripes into shared memory 115 (shown in FIG. 1).

In step 910, the pieces are processed on appropriate CPUs by generating processing controller threads to receive the pieces from corresponding reader threads, generating processing threads to extract a plurality of sub-pieces for each piece, and moving the sub-pieces to appropriate rendering nodes. For example, as shown in FIG. 4, processing controller threads 402-405 receive stripes 302-305 from reading stage 210. Each processing controller thread 402-405 generates four processing threads 410-425 to extract four tiles from each stripe and move the tiles to rendering stage 220.

In step 915, a quantity of sub-pieces are downloaded to an equal quantity of graphics processors by using renderer threads to receive the sub-pieces from corresponding processing threads. According to process 900, a total quantity of sub-pieces exceeds the quantity of graphics processors. For example, as shown in FIG. 5, renderer threads 502-517 receive tiles from processing stage 215 and download the tiles to graphics processors 540-555.

If in step 920, the total quantity of sub-pieces has been processed, then process 900 proceeds to step 925. In step 925, the processed sub-pieces are transferred back into the shared memory and recombined for storage as a single image. If in step 920 the total quantity of sub-pieces has not been processed, then process 900 returns to step 915. Because the sub-pieces are not being outputted to media outputs, there is no need to process all of the sub-pieces at the same time to maintain synchronization. Accordingly, in process 900, the quantity of sub-pieces can exceed the quantity of graphics processors. Sub-pieces are downloaded to the graphics processors for processing in a round-robin fashion, until all of the sub-pieces have been downloaded and processed.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention.

What is claimed is:

1. A pipelined, multithreaded system for prioritizing movement of data, comprising:

one or more central processing units (CPUs), each CPU executing one or more threads;
a global clock for defining a current target image number;
a plurality of media processors; and
a shared memory;
wherein the one or more threads include:
a read controller thread that controls one or more reader threads, wherein each reader thread receives a piece of source image data and loads the piece into the shared memory, the piece carrying an associated image number,
a plurality of processing controller threads, each receiving a piece with its associated image number from a corresponding reader thread and generating a plurality of processing threads, wherein each processing thread extracts a plurality of sub-pieces from each piece and moves the sub-pieces through the system, each sub-piece retaining the image number associated with the piece from which it was extracted, and
a rendering controller thread that controls a plurality of renderer threads, each renderer thread receiving a sub-piece with its associated image number from a corresponding processing thread, wherein each renderer thread downloads the sub-piece to an appropriate media processor for synchronized output of the sub-pieces, wherein synchronization and selection of the appropriate media processor is based on the associated image number and the current target image number defined by the global clock.

2. The system of claim 1, wherein the source image data includes audio data, and wherein the media processors include a plurality of video processors having associated video outputs and an audio processor having an associated audio output.

3. The system of claim 2, wherein synchronized output of the sub-pieces includes synchronizing display of the sub-pieces via video outputs with playback of the audio data via an audio output.

4. The system of claim 1, further comprising a plurality of video displays, each displaying one of the sub-pieces to form a composite image stream.

5. The system of claim 1, further comprising a multiple-input projector having a plurality of inputs, wherein the multiple-input projector combines the sub-pieces received at the inputs and displays a composite image stream.

6. The system of claim 1, wherein the media processors include graphics processors, and wherein a quantity of sub-pieces equals a quantity of graphics processors.

7. The system of claim 1, further comprising a device coupled to the system from which the reader threads receive the pieces of the source image data.

8. The system of claim 7, wherein the device includes one or more of a storage device, a redundant array of inexpensive disks (RAID) storage subsystem, a network device, a CPU that programmatically generates the source image data stream, or a video input device.

9. The system of claim 1, wherein the shared memory includes a non-uniform memory access system architecture (NUMA) memory.

10. The system of claim 1, further comprising a thread-safe queue that queues the pieces and sub-pieces.

11. The system of claim 1, further comprising a global controller thread that controls the threads.

12. A pipelined, multithreaded system for prioritizing movement of data, comprising:

one or more central processing units (CPUs), each CPU executing one or more threads;
a global clock for defining a current target image number;
a plurality of media processors; and
a shared memory;

wherein the one or more threads include:
- a read controller thread that controls a plurality of reader threads, wherein each reader thread receives a piece of source image data and loads the piece into the shared memory, the piece carrying an associated image number, and
- a rendering controller thread that controls a plurality of renderer threads, each renderer thread receiving a piece with its associated image number from a corresponding reader thread, wherein each renderer thread downloads the piece to an appropriate media processor for synchronized output of the pieces, wherein synchronization and selection of the appropriate media processor is based on the associated image number and the current target image number defined by the global clock.

13. The system of claim 12, wherein the source image data includes audio data and the media processors include a plurality of video processors having associated video outputs and an audio processor having an associated audio output, and wherein synchronized output of the pieces includes synchronizing display of the pieces via the video outputs with playback of the audio data via the audio output.

14. A pipelined, multithreaded method for prioritizing movement of data, comprising:
(a) receiving source image data as one or more pieces, wherein for each piece a reader thread is generated that loads the piece into a shared memory and each piece is tagged with an associated image number;
(b) processing the pieces on appropriate central processing units (CPUs), wherein one or more processing controller threads receive the pieces from corresponding reader threads, wherein each processing controller thread generates a plurality of processing threads that extract a plurality of sub-pieces for each piece, each sub-piece retaining the image number associated with the piece from which it was extracted, and wherein the processing threads move the sub-pieces to appropriate rendering nodes;
(c) downloading the sub-pieces and their associated image numbers to corresponding media processors, wherein a plurality of renderer threads executing on the CPUs receive the sub-pieces from corresponding processing threads;
(d) synchronizing the reader, processing, and renderer threads to a global clock that defines a current target image number: and
(e) outputting synchronized sub-pieces as a composite image based on their associated image numbers and the current target image number defined by the global clock.

15. The method of claim 14, wherein step (a) comprises receiving the source image data from one or more of a storage device, a network device, a CPU that programmatically generates the source image data, and a video input device.

16. The method of claim 14, wherein step (b) further comprises one or more of reformatting, filtering, and decimating the pieces.

17. The method of claim 14, wherein step (c) further comprises processing the sub-pieces on the media processors.

18. The method of claim 17, wherein the media processors include graphics processors, and wherein the processing the sub-pieces includes one or more of convolution, color correction, smoothing, edge detection, changing an orientation, and optimizing texture download.

19. The method of claim 14, wherein the source image data includes audio data and the media processors include a plurality of video processors having associated video outputs and an audio processor having an associated audio output, and wherein step (e) comprises synchronizing display of the synchronized sub-pieces via the video outputs with playback of the audio data via the audio output.

20. The method of claim 14, further comprising transferring the synchronized sub-pieces back into the shared memory and recombining the sub-pieces for storage as a single image.

21. The method of claim 14, further comprising buffering the pieces and sub-pieces in a thread-safe queue to maintain a rate of display.

22. The method of claim 14, further comprising tagging the pieces and sub-pieces with a destination location and a size relative to the composite image.

23. The method of claim 14, further comprising locking the reader, processing, and renderer threads to CPUs appropriate to data locality requirements of the threads.

24. The method of claim 23, further comprising allocating memory on nodes containing the CPUs that are executing the threads according to a placement policy.

25. A pipelined, multithreaded method for prioritizing movement of data, comprising:
(a) receiving source image data as a plurality of pieces, wherein for each piece a reader thread is generated that loads the piece into a shared memory and each piece is tagged with an associated image number;
(b) moving the pieces to appropriate rendering nodes;
(c) downloading the pieces to appropriate media processors based on their associated image numbers, wherein a plurality of renderer threads receive the pieces from corresponding reader threads;
(d) synchronizing the reader and renderer threads to a global clock that defines a current target image number; and
(e) outputting synchronized pieces as a composite image based on their associated image numbers and the current target image number defined by the global clock.

26. The method of claim 25, wherein the source image data includes audio data and the media processors include a plurality of graphics processors having associated video outputs and an audio processor having an associated audio output, and wherein step (e) further comprises synchronizing display of the synchronized pieces via the video outputs with playback of the audio data via the audio output.

27. A pipelined, multithreaded method for prioritizing movement of data, comprising:
(a) receiving source image data as one or more pieces, wherein for each piece a reader thread is generated that loads the piece into a shared memory and each piece is tagged with an associated image number;
(b) processing the pieces on appropriate central processing units (CPUs), wherein one or more processing controller threads receive the pieces from corresponding reader threads, wherein each processing controller thread generates a plurality of processing threads that extract a plurality of sub-pieces for each piece, each sub-piece retaining the image number associated with the piece from which it was extracted, and wherein the processing threads move the sub-pieces to appropriate rendering nodes;
(c) downloading a quantity of sub-pieces and their associated image numbers to an equal quantity of graphics processors, wherein a plurality of renderer threads receive the sub-pieces from corresponding processing threads, and wherein a total quantity of sub-pieces exceeds the quantity of graphics processors;
(d) synchronizing the reader, processing, and renderer threads to a global clock that defines a current target image number; and
(e) processing the sub-pieces on the graphics processors; and
(f) repeating steps (c), (d) and (e) until the total quantity of sub-pieces is processed.

28. The method of claim 27, further comprising transferring the processed sub-pieces back into the shared memory and recombining the sub-pieces for storage as a single image.

29. The method of claim 27, wherein step (e) includes one or more of convolution, color correction, smoothing, edge detection, changing an orientation, and optimizing texture download.

* * * * *